July 18, 1950  E. H. PIRON  2,515,468
ELECTRIC BRAKE
Filed March 19, 1945
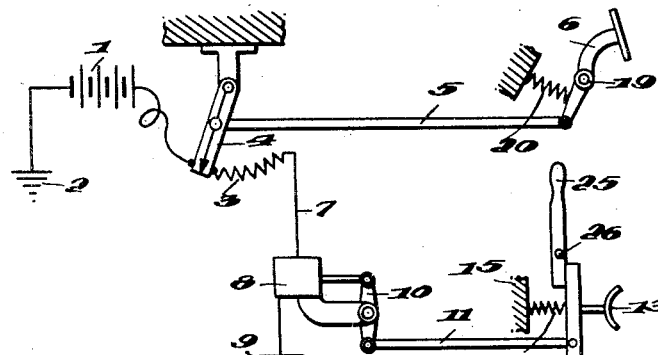
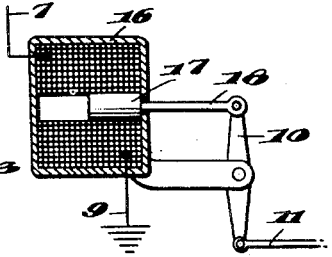
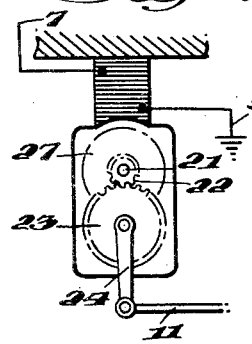
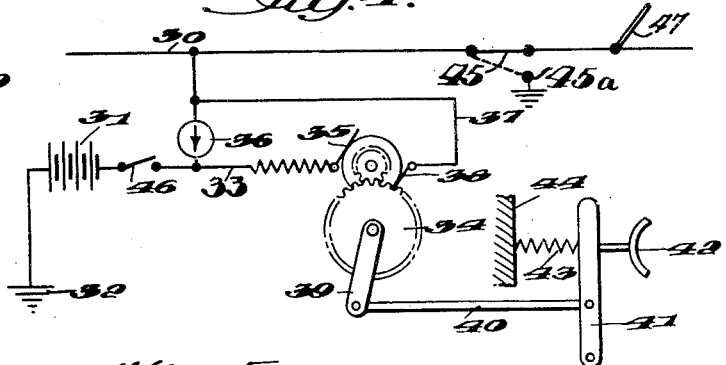
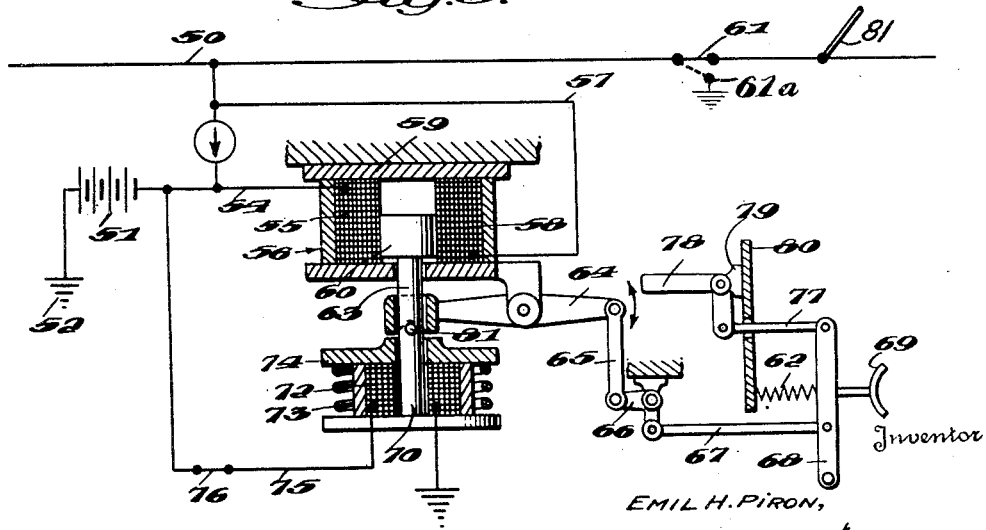
EMIL H. PIRON,
Inventor
By Hudson Davis
Attorney Patented July 18, 1950

2,515,468

UNITED STATES PATENT OFFICE 2,515,468

ELECTRIC BRAKE

Emil H. Piron, New York, N. Y., assignor to Transit Research Corporation, New York, N. Y., a corporation of New York Application March 19, 1945, Serial No. 583,435

6 Claims. (Cl. 188—106)

This invention relates to electrically operated brakes for vehicles and has for its object to provide an improved and simplified system by which one or more brakes may be applied electrically and relieved mechanically by springs.

A main object is to provide an electrically actuated brake which will function in a manner similar to well known and successful air brake systems but which will be more rapid in operation, which will be of simpler construction, which can be constructed, installed and maintained at less expense and which is reliable.

Another object is to provide an electrically actuated, spring return brake which is applicable generally for train use and which, in modified form may be employed on a single vehicle such as a street car.

A further object is to provide an electrically actuated, spring return brake together with a spring applied parking brake which is also an emergency brake.

Another object is to provide an electrically operated brake which may be operated solely by a battery or which may be made to respond to a difference in potential between a main line connected with a plurality of sets of brakes and a battery individual to each of said sets, the battery in each case being the brake motivating means.

Other objects and advantages will become hereinafter more fully apparent as reference is had to the accompanying drawings in which:

Figure 1 is a diagram of my improved electrical brake actuated solely by a battery, Figures 2 and 3 are enlarged details of alternate forms of the electric operator of Figure 1, Figure 2 being shown in side elevation and Figure 3 in vertical diametric section, Figure 4 is a diagrammatic showing of my improved braking system in modification of the showing of Figure 1 actuated by a difference in potential between a power line and a battery, and Figure 5 is a modification of the brake system of Figure 4 having an automatic emergency and parking brake.

More particularly, 1 indicates a battery which is grounded at 2 and connected to a variable resistance 3. The arm 4 of the resistance 3 is pivotally connected by a link 5 to a foot pedal 6. A line 7 leads through an electric operator 8 to a ground 9.

The operator 8 actuates an arm 10 which is pivotally connected to a link 11 which in turn, is pivotally connected to a brake arm 12. A brake shoe 13 is carried by the brake arm 12. A return spring 14 is connected at one end to the brake arm 12 and at its other end to a suitable stationary point 15 on the vehicle upon which the brakes are mounted.

The electric operator, as illustrated in Figure 2, is composed essentially of any electric actuator such as a solenoid coil 16 having a core 17 therein, the core having a rigid extension 18 for pivotal connection to the arm 10.

The operation is as follows: The foot pedal 6 is pivotally mounted at 19 and, when not pressed by the foot of an operator, is held by the spring 20 in retracted position, as illustrated. Depression of the pedal pulls the link 5 to the right thus swinging the rheostat arm 4 into contact with the resistance 3. As the pedal 6 is further depressed the arm 4 moves further to the right until sufficient current finally flows through the operator 8 to the ground 9 to cause movement of the core 17 to the left, against the resistance of the spring 14, thus applying the brake shoe 13 to a brake drum or to the tread surface of a wheel (not shown). Release of the brake pedal reduces the current flow through the electric operator 8 until a point is reached where the spring 14 overcomes the resistance of the solenoid and retracts the shoe.

The electric operator illustrated in Figure 3 is composed essentially of an electric motor 27 having a shaft 21 which carries a pinion 22. This pinion meshes with a gear 23 for rotative or swinging movement of an arm 24 pivotally connected to the brake actuating link 11. When current flows from the line 7 through the coils of the motor 27 and to the ground 9, the shaft 21 with its gear 22 is rotated. The gear 22 rotates the gear 23 which swings the arm 24 through an arc, the motor winding being such that the outer end of the arm 11 is forced to the right, in the illustration, thus applying the brake shoe 13 against the action of the spring 14. Upon reduction of current to the motor 27 the spring 14 causes the arm 11 to move to the left retracting the brake shoe and rotating the gears 23 and 22 in reverse direction.

A hand brake lever 25 mounted on a fixed pivot 26 is used as an emergency brake and for parking.

Figure 4 shows a modification of the system in which a battery actuates the brakes but in which a main line is connected to the battery and also to one side or terminal of the electric operator, actuation of the electric operator being dependent upon a difference in potential between the battery and the main line. In this form, a main electric power line 30 may extend, as by trolley, through a number of cars of a train or it may extend, as by trolley, to more than one truck of a street car.

A battery 31 is grounded at 32 and connected by a line 33 to an electric operator 34 which may suitably be either of the type illustrated in Figure 2 or Figure 3 but which is illustrated as the type of Figure 3 with the line 33 being connected to one brush 35 of the motor thereof. The main line 30 is connected into the line 33 through a thermionic valve 36 which permits a unidirectional flow of current from the line 30 to the line 33. Ahead of the thermionic valve 36, a line 37 leads from the line 30 to the other brush 38 of the motor of the electric operator 34. The electric operator has an arm 39 pivotally connected to the link 40 which, in turn, is pivotally connected to the brake arm 41 which carries a brake shoe 42. A take-off spring 43 is connected to the brake arm 41 at one end and to a suitable point 44 on the vehicle at its other end.

In operation, the potential in the main line 30 is maintained at the level necessary to keep the battery 31 charged. Thus when the manual switch 45 between the trolley 47 and the line 30 is closed the battery 31 is being charged, the brush 35 of the electric operator 34 is subjected to the current of the line 30 and the brush 38 is also subject to the current of the line 30 so that the electric operator is electrically balanced. The operator therefore exerts no force on the arm 39 and the brake shoe is held in non-braking position by the take-off spring 43.

When the switch 45 is opened it grounds the line 30 through the terminal 45a and the potential in the line 37 is lowered, the drop through the line 37 affects one terminal 38 of the operator 34 but not the other one, 35, which is maintained by the battery 31 and the thermionic valve 36.

The result is that a difference of potential is created between the two terminals of the operator 34, that current flows through it from the battery 31 to the main line 30 and that this current causes the operator to swing its arm 39 through an arc to the right, as viewed in Figure 4. The link 40 is forced to the right thus causing movement of the brake arm 41 and brake shoe 42 in brake-applying direction.

When, after a brake application the potential is restored in the main line 30 by closing the switch 45, the difference of potential ceases to exist between the terminals or brushes 35 and 38 of the operator thus again balancing the operator, and the brake shoe is retracted by the spring 43.

This arrangement is simple and, in case of train operation, very safe because general failure can affect only that part of the system located at the side of the line 30 outwardly of the thermionic valve which will cause a brake application. Failures that may happen at the other side of the valve 36 cannot be general but will affect only one car. In that case, the brakes of that car can be made inoperative simply by opening the switch 46 in the line 33, or otherwise disconnecting the battery 31. Operation of the train can be continued until there is opportunity to repair the trouble on that one car. As for general failure due to an accident an auxiliary line may be provided to supplement the line 30 until the main line can be repaired.

A hand brake for prolonged parking would be desirable with the above system. Automatic parking without current flow may be provided as will now be described with reference to Figure 5.

In this case the main electric power line 50 is maintained at a potential sufficient to keep the battery 51 charged, the ground 52 being added to permit charging. Current flow to the battery 51 is through a thermionic valve 53 which permits current to flow only in the direction of the arrow. A line 54 leads from the battery 51 to one side or terminal 55 of an electric operator 56 and a second line 57 leads from the line 50, outwardly of the thermionic valve 53, to the other side of terminal 58 of the operator. The operator, as illustrated, is of the type shown in Figure 2 in which a solenoid coil 59 has a core 60 which is drawn thereinto upon establishment of a difference of potential between its terminals 55 and 58.

When the switch 61 between a trolley 81 and the line 50 is closed there is no difference in potential between the lines 54 and 57, the coil 59 is not energized and the core 60 resides in the position shown, being held there by the action of the take-off spring 62. When the switch 61 is opened it grounds the line 50 through the terminal 61a and there is a reduction in the potential of the line 57, current flows from the battery 51 through the coil 59, thus energizing it, and the core 60 is drawn up into the coil. An extension 63 of the core has a pin 81 therethrough for abutment against an arm 64, this arm being connected through the linkage 65, 66, 67 and 68 to a brake shoe so arranged that elevation of the core 60 moves the brake shoe 69 into brake-applying position.

The foregoing is all similar to the operation explained in connection with Figure 4. The parking brake is added. It consists of an extension 70 on the core shaft 63 having a plate 71 fixedly secured thereto and supporting a solenoid 72. Around this solenoid is a coil spring 73. Slidably encompassing the extension shaft 70 and resting on the spring 73 is an armature plate 74. The solenoid is provided with current from a line 75 independent from the line 50.

As long as current passes through the solenoid 72, the armature 74 is retained in contact with the magnet of the solenoid 72 against the action of the spring 73. The operator 56 then functions as though the braking device were not present. If the switch 76 of the line 75 is opened current flow through the solenoid 72 ceases, the spring 73 forces the plate 74 outwardly along the shaft 63, 70, whereupon it forces the contacted end of the arm 64 to be elevated thus actuating the linkage 65, 66, 67 and 68 to apply the brake shoe 69 and to maintain the application. When, subsequently, a brake application is called for by dropping the potential in the line 50, the core 60 is pulled upwardly into the coil 59 thus elevating the plate 71 and forcing the armature 74 to the solenoid 72. By closing the switch 76 the solenoid 72 then holds the armature thereagainst and retains the spring 73 in compressed position ready for another application. This system is very reliable since if the entire system which responds to the line 50 and to all batteries 51 should fail, the brakes may still be applied merely by opening the switch 76.

In the event that the brake is applied by this device and a single car is parked it would be desirable to provide a manual brake release. This is done by a link 77 pivotally connected to the brake arm 68 at one end and to a bell crank 78 at its other end. The bell crank is pivotally mounted on a bracket 79 fixed to a stationary member 80 of the vehicle.

It will be understood that the means for gradually applying the brakes illustrated in Figure 1 as represented by the brake pedal and variable resistance are equally applicable to the systems of Figures 4 and 5.

Various changes may be made in the illustrations without departing from the spirit of my invention and I therefore desire to be extended protection as defined by the appended claims.

What I claim is:

1. In combination, a brake, electrically energized means for applying said brake during normal operation, a spring actuated means for applying said brake for prolonged parking and in case of failure of said electrically energized means, a second electrically energized means normally restraining said spring actuated means against operation, a manually operable switch for opening the circuit of said second electrically energized means, said spring actuated means operating to apply said brake in response to accidental or intentional de-energization of its electrically energized means, and automatic means operative to release said brake in response to a re-energization of said second electrically energized means and to a re-energization and subsequent de-energization of said first electrically energized means.

2. In combination, a brake, electrically energized means for applying said brake during normal operation, a spring actuated means for applying said brake for prolonged parking and in case of failure of said electrically energized means, a second electrically energized means normally restraining said spring actuated means against operation, a manually operable switch for opening the circuit of said second electrically energized means, said spring actuated means operating to apply said brake in response to accidental or intentional de-energization of its electrically energized means, automatic means operative to release said brake in response to a re-energization of said second electrically energized means and to a re-energization and subsequent de-energization of said first electrically energized means and manual means adapted for use in case of failure of re-energization of either of said first or second electrically energized means for releasing said brake against the action of said spring actuated means.

3. In combination, a brake, electrically energized means for applying said brake during normal operation, a spring actuated means for applying said brake for prolonged parking and in case of failure of said electrically energized means, a second electrically energized means normally restraining said spring actuated means against operation, a manually operable switch for opening the circuit of said second electrically energized means, said spring actuated means operating to apply said brake in response to accidental or intentional de-energization of its electrically energized means, and spring return means operative to release said brake when neither of the brake applying means are active in the application thereof.

4. In combination, a brake, a first electrically energized means for applying said brake in normal operation, a spring actuated means for applying said brake in an emergency and for parking, a second electrically energized means for retaining said spring actuated means against functioning during operation of said first named means, manual means for de-energizing said second means whereby said spring actuated means applies said brake, said spring actuated means being retracted from brake applying position by joint re-energization of said first and second electrically energized means and subsequent de-energization of said first means while retaining energization of said second means, and a take-off spring operative to release said brake when both of said brake applying means are inoperative.

5. An electric braking system comprising a brake shoe, an electric operator having two terminals, a linkage movable in response to energization of said operator to move said shoe to brake applying position, and spring means operable to retract said shoe when said operator is not under energization, a battery connected to one terminal of said operator, an electric power line having two branches each of which is connected to one of said terminals, the branch connected to the terminal to which said battery is connected having a device therein capable of restricting the current flow therethrough to a direction toward its terminal, and a manually operable switch in said power line common to both of said branches, said switch when open de-energizing said branches thereby causing said operator to be energized by the current from said battery, said device preventing a refluent current from said battery through said branches, said switch upon being reclosed re-establishing equilibrium between said terminals, said battery being grounded at its side opposite to that connected to an operator terminal and being restored in potential by re-energization of said power line.

6. An electric braking system comprising a brake shoe, an electric operator having two terminals, a linkage movable upon energization of said operator to move said shoe to brake applying position, a battery connected by a battery line to one of said terminals, a power line having one branch leading to said battery line and another branch leading to said other terminal, the first branch having a device therein restricting the flow of current in said first branch to a direction toward said battery line, said power line when energized causing an equilibrium of current between said terminals, spring means retracting said brake shoe when said terminals are in equilibrium, a manually operable switch in said power line outwardly of and controlling the flow of current to both of said branches which, when open, causes a drop of potential in said branches which is maintained in said battery line by said battery, thereby causing energization of said electric operator and application of said brake shoe, said battery being grounded on its side opposite said battery line, said power line restoring the potential of said battery and restoring equilibrium between said terminals upon reclosing of said manual switch.

EMIL H. PIRON.

REFERENCES CITED

The following references are of record in the file of this patent:

UNITED STATES PATENTS

| Number | Name | Date |
| --- | --- | --- |
| 360,060 | Sperry | Mar. 29, 1887 |
| 372,598 | Card | Nov. 1, 1887 |
| 574,120 | Sperry | Dec. 29, 1896 |
| 618,864 | Graber | Feb. 7, 1899 |
| 767,258 | Berry | Aug. 9, 1904 |
| 950,336 | Marsh | Feb. 22, 1910 |
| 1,059,096 | Wotton | Apr. 15, 1913 |
| 1,501,600 | Hartford | July 15, 1924 |
| 1,991,903 | Logan, Jr. | Feb. 19, 1935 |
| 2,118,246 | Jutson | May 24, 1938 |
| 2,172,116 | Warren | Sept. 5, 1939 |
| 2,257,302 | Larson | Sept. 30, 1941 |